(12) United States Patent
Fujita et al.

(10) Patent No.: US 9,527,030 B2
(45) Date of Patent: Dec. 27, 2016

(54) METHOD FOR PREVENTING FOULING OF EXHAUST GAS FLOW PATH OF BURNING EQUIPMENT AND METHOD FOR REMOVING AMMONIUM HYDROGEN SULFATE CONTAINED IN EXHAUST GAS OF BURNING EQUIPMENT

(71) Applicant: KURITA WATER INDUSTRIES LTD., Nakano-ku, Tokyo (JP)

(72) Inventors: Satoshi Fujita, Tokyo (JP); Kouichi Tanaka, Tokyo (JP); Masahiko Mitsuta, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 0 days.

(21) Appl. No.: 14/602,891

(22) Filed: Jan. 22, 2015

(65) Prior Publication Data

US 2015/0224441 A1 Aug. 13, 2015

(30) Foreign Application Priority Data

Feb. 12, 2014 (JP) ................................. 2014-024691

(51) Int. Cl.
*B01D 53/48* (2006.01)
*B01D 53/54* (2006.01)
*F23J 15/00* (2006.01)
*F23J 15/02* (2006.01)

(52) U.S. Cl.
CPC ............ *B01D 53/485* (2013.01); *B01D 53/54* (2013.01); *F23J 15/003* (2013.01); *F23J 15/006* (2013.01); *F23J 15/02* (2013.01); *B01D 2251/206* (2013.01); *B01D 2252/20431* (2013.01); *B01D 2257/302* (2013.01); *B01D 2257/406* (2013.01); *B01D 2258/0283* (2013.01); *F23J 2215/10* (2013.01); *F23J 2215/20* (2013.01); *F23J 2217/102* (2013.01); *F23J 2219/10* (2013.01)

(58) Field of Classification Search
None
See application file for complete search history.

(56) References Cited

U.S. PATENT DOCUMENTS 5,603,909 A * 2/1997 Varner ................. B01D 53/504
422/173
2003/0228246 A1* 12/2003 Hammer ............ B01D 53/1456
423/235

FOREIGN PATENT DOCUMENTS

| JP | S62-167391 A | 7/1987 |
| JP | S62-167393 A | 7/1987 |
| JP | 2013-006156 A | 1/2013 |

* cited by examiner

*Primary Examiner* — Melvin C Mayes
*Assistant Examiner* — Sheng H Davis
(74) *Attorney, Agent, or Firm* — Manabu Kanesaka (57) ABSTRACT

Provided is a method for effectively preventing fouling of an exhaust gas flow path of a burning equipment due to ammonium hydrogen sulfate; and thus, the method for preventing fouling of an exhaust gas flow path of a burning equipment in the present invention comprises: a step of adding a tertiary amine and/or a quaternary ammonium compound to an exhaust gas which contains ammonium hydrogen sulfate which is generated in a burning equipment thereby forming a reaction product between the ammonium hydrogen sulfate and the tertiary amine and/or the quaternary ammonium compound, and a step of controlling a temperature and a relative humidity in at least a part of an exhaust gas flow path of the burning equipment in such a way that the reaction product may be kept in a solid state.

8 Claims, 4 Drawing Sheets

METHOD FOR PREVENTING FOULING OF EXHAUST GAS FLOW PATH OF BURNING EQUIPMENT AND METHOD FOR REMOVING AMMONIUM HYDROGEN SULFATE CONTAINED IN EXHAUST GAS OF BURNING EQUIPMENT

RELATED APPLICATIONS

The present application is based on, and claims priority from, Japanese Application No. JP2014-024691 filed Feb. 12, 2014, the disclosure of which is hereby incorporated by reference herein in its entirety.

BACKGROUND OF THE INVENTION

1. Field of the Invention

The present invention relates to a method for preventing fouling of an exhaust gas flow path of a burning equipment and to a method for removing ammonium hydrogen sulfate which is contained in an exhaust gas of the burning equipment.

2. Description of the Related Art

In the burning equipment including a boiler which uses a sulfur-containing substance as a fuel such as a heavy oil, a coal, a natural gas, a biomass, and a wasted substance, an $SO_2$ gas is generated when these fuels are burnt.

This $SO_2$ gas is partially oxidized to $SO_3$ by those substances including $O_2$ in the exhaust gas, oxidation catalyst components contained in the fuels ($V_2O_5$, etc.), and the oxidation catalyst ($V_2O_5$) and the like contained in the denitration catalyst. This $SO_3$ becomes sulfuric acid by taking water which is present in the exhaust gas during the time when the temperature of the exhaust gas descends.

On the other hand, in the burning equipment including a boiler, $NH_3$ is charged for denitration in the denitration equipment (hereinafter, sometimes referred to as "SCR") and for neutralization of the $SO_3$ mist in the electrical dust collector (hereinafter, sometimes referred to as "EP").

During this process, if the amount of $NH_3$ is two times or more in the molar ratio relative to $SO_3$, ammonium sulfate is generated: while if the amount thereof is less than two times, ammonium hydrogen sulfate is generated. Therefore, when amount of $SO_3$ generated is increased due to change of the fuel quality, deterioration of member equipment to constitute the boiler, and so forth, the molar ratio of $NH_3/SO_3$ decreases relatively thereby causing increase of the production ratio of ammonium hydrogen sulfate.

It is known that the ammonium hydrogen sulfate which is generated in the burning equipment is deposited and adhered in the economizer (hereinafter, sometimes referred to as "ECO") that is installed at the boiler outlet port, in the heat-exchanging member including an element of the air-heating unit (hereinafter, sometimes referred to as "APH"), and in SCR, EP, and the like, thereby causing problems such as corrosion and clogging of the smoke path. To overcome these problems due to ammonium hydrogen sulfate, following means have been proposed.

In the patent document 1, a proposal was made as to the method for preventing fouling that is caused by ammonium hydrogen sulfate and so on, wherein a quaternary ammonium compound is contacted with the exhaust gas which contains ammonium hydrogen sulfate and so on thereby changing ammonium hydrogen sulfate and so on to different substances, which are then liquefied or vaporized.

In the patent document 2 and the patent document 3, proposals were made as to the method for reducing the $SO_3$ compound (ammonium hydrogen sulfate), wherein a Mg compound is introduced into the exhaust gas so as to deactivate heavy metal compounds including $V_2O_5$ which are catalysts to generate the $SO_3$ compound, or a Fe compound is included in the fuel in order to facilitate the burning of the unburnt carbons whereby bringing the exhaust gas to the low-oxygen state so that the production amount of $SO_3$ may be suppressed.

PRIOR ART DOCUMENTS

Patent Documents

[Patent document 1] Japanese Patent Laid-Open Publication No. 2013-006156
[Patent document 2] Japanese Patent Laid-Open Publication No. S62-167391
[Patent document 3] Japanese Patent Laid-Open Publication No. S62-167393

SUMMARY OF THE INVENTION

However, in the method proposed in the patent document 1, the effect thereof is dependent on the temperature of the exhaust gas as well as the relative humidity in the exhaust gas. Specifically, if the temperature of the exhaust gas is high, for example, 350° C. or higher, the reaction product between the quaternary ammonium compound and ammonium hydrogen sulfate is vaporized so that the fouling due to ammonium hydrogen sulfate can be prevented. Under the environment with a high relative humidity, the reaction product is liquefied thereby flowing to the bottom of each equipment to constitute the boiler so that it can be discharged outside the system.

That is, according to the method proposed in the patent document 1, under the environment in which the reaction product is vaporized or liquefied, the fouling due to ammonium hydrogen sulfate may be prevented; however, outside the said environment, there have been no studies how to prevent fouling due to ammonium hydrogen sulfate. Moreover, in the case that the reaction product is liquefied, there is a possibility that it may become a adhesion matter if the appropriate amount of water is not present; and in the case that the reaction product is vaporized, there is a possibility that the vaporized compound may cause harmful effects on operation of the boiler as well as to an environment.

In the method of the patent document 2 and 3, by adding a Mg compound to the fuel, the magnesium compound and $V_2O_5$ contained in the fuel react in the burning furnace whereby lowering the catalyst activity of $V_2O_5$ so that the amount of $SO_3$ generated can be reduced. However, in the boiler having SCR installed in a later stage of the process, $SO_3$ is generated secondarily by the denitration catalyst ($V_2O_5$) in SCR, so that this cannot be suppressed. In the case that the Fe compound is added to the fuel, the $O_2$ concentration can be lowered by facilitating the burning in the burning furnace; however, if an air is leaked in APH and so forth, generation of $SO_3$ cannot be suppressed. Even if the addition amount of the Mg compound should be increased to neutralize it in a stage following after SCR, there is a risk that the equipment including SCR may be clogged by large coarse inorganic particles of the Mg compound and so forth.

The present invention was made in view of the situation as mentioned above; and objects of the present invention are to provide a method for effectively preventing fouling of an exhaust gas flow path of a burning equipment due to ammonium hydrogen sulfate and a method for effectively removing ammonium hydrogen sulfate which is contained in an exhaust gas of a burning equipment.

That is, the present invention provides the following (1) to (6).

(1) A method for preventing fouling of an exhaust gas flow path of a burning equipment, wherein the method comprises:

a step of adding a tertiary amine and/or a quaternary ammonium compound to an exhaust gas which contains ammonium hydrogen sulfate which is generated in a burning equipment, thereby forming a reaction product between the ammonium hydrogen sulfate and the tertiary amine and/or the quaternary ammonium compound, and a step of controlling a temperature and a relative humidity in at least a part of an exhaust gas flow path of the burning equipment in such a way that the reaction product may be kept in a solid state.

(2) The method for preventing fouling of an exhaust gas flow path of a burning equipment according to (1), wherein a near-critical value of a relative humidity at which the reaction product can be kept is measured at plural temperatures in a solid state, whereby the temperatures are plotted in the x-axis and the near-critical value of the relative humidity are plotted in the y-axis, and then, y=ax+b, an equation showing a relationship between the temperature and the near-critical value of the relative humidity, is calculated by a least square method, and further the temperature and the relative humidity are controlled such that the relationship of y≤ax+b may be satisfied so that the reaction product may be kept in the solid state.

(3) The method for preventing fouling of an exhaust gas flow path of a burning equipment according to (1), wherein in the step of forming the reaction product, hydroxy diethyl trimethyl ammonium hydroxide is used as the tertiary amine and/or the quaternary ammonium compound and a sulfate salt of the hydroxy diethyl trimethyl ammonium hydroxide is formed as the reaction product, and in the step of controlling a temperature and a relative humidity, the temperature and the relative humidity are controlled in such a way that a relationship of the following equation (1) may be satisfied so that the sulfate salt of the hydroxy diethyl trimethyl ammonium hydroxide may be kept in the solid state.

$$Y \leq -0.1746X + 39.082 \quad (1)$$

(In the equation, Y represents the relative humidity (%), and X represents the temperature (° C.).)

(4) A method for removing ammonium hydrogen sulfate which is contained in an exhaust gas of a burning equipment, wherein the method comprises:

a step of adding a tertiary amine and/or a quaternary ammonium compound to an exhaust gas which contains ammonium hydrogen sulfate which is generated in a burning equipment, thereby forming a reaction product between the ammonium hydrogen sulfate and the tertiary amine and/or the quaternary ammonium compound, a step of controlling a temperature and a relative humidity in at least a part of an exhaust gas flow path of the burning equipment in such a way that the reaction product may be kept in a solid state, and a step of capturing the reaction product by a dust collector thereby removing the reaction product thus captured.

(5) The method for removing ammonium hydrogen sulfate which is contained in an exhaust gas of a burning equipment according to (4), wherein a near-critical value of a relative humidity at which the reaction product can be kept in a solid state is measured at plural temperatures, whereby the temperatures are plotted in the x-axis and the near-critical value of the relative humidity are plotted in the y-axis, and then, y=ax+b, an equation showing a relationship between the temperature and the near-critical value of the relative humidity, is calculated by a least square method, and further the temperature and the relative humidity are controlled such that the relationship of y≤ax+b may be satisfied so that the reaction product may be kept in the solid state.

(6) The method for removing ammonium hydrogen sulfate which is contained in an exhaust gas of a burning equipment according to (4), wherein in the step of forming the reaction product, hydroxy diethyl trimethyl ammonium hydroxide is used as the tertiary amine and/or the quaternary ammonium compound and a sulfate salt of the hydroxy diethyl trimethyl ammonium hydroxide is formed as the reaction product, and in the step of controlling a temperature and a relative humidity, the temperature and the relative humidity are controlled in such a way that a relationship of the following equation (1) may be satisfied so that the sulfate salt of the hydroxy diethyl trimethyl ammonium hydroxide may be kept in the solid state.

$$Y \leq -0.1746X + 39.082 \quad (1)$$

(In the equation, Y represents the relative humidity (%), and X represents the temperature (° C.).)

According to the present invention, fouling of an exhaust gas flow path of a burning equipment due to ammonium hydrogen sulfate can be effectively prevented, and ammonium hydrogen sulfate which is contained in an exhaust gas of a burning equipment can be effectively removed.

BRIEF DESCRIPTION OF THE DRAWINGS

FIG. 1

This shows a general schematic flow diagram of a boiler.

FIG. 2

This is a scatter plot showing the states of the phase in the sulfate salt (choline sulfate salt) of hydroxy diethyl trimethyl ammonium hydroxide (the solid state (Sol), the mixed state of the solid and liquid states (Liq/Sol), or the liquid state (Liq)).

FIG. 3

This shows the TG-DTA measurement chart of ammonium hydrogen sulfate.

FIG. 4

This shows the TG-DTA measurement chart of the reaction product in Example 2 (choline sulfate salt).

FIG. 5

This shows a schematic diagram of a model plant of Example 3.

FIG. 6

This shows the TG-DTA measurement chart of the adhesive substance on the heat-exchanging tube in Example 3.

DESCRIPTION OF THE PREFERRED EMBODIMENTS

1. The Method for Preventing Fouling of an Exhaust Gas Flow Path of a Burning Equipment The method for preventing fouling of an exhaust gas flow path of a burning equipment in the present invention comprises: a step of adding a tertiary amine and/or a quaternary ammonium compound to an exhaust gas which contains ammonium hydrogen sulfate which is generated in a burning equipment thereby forming a reaction product between the ammonium hydrogen sulfate and the tertiary amine and/or the quaternary ammonium compound, and a step of controlling a temperature and a relative humidity in at least a part of an exhaust gas flow path of the burning equipment in such a way that the reaction product may be kept in a solid state. Hereunder, explanation will be made as to embodiments of the method for preventing fouling of an exhaust gas flow path of a burning equipment in the present invention.

Figure 1:
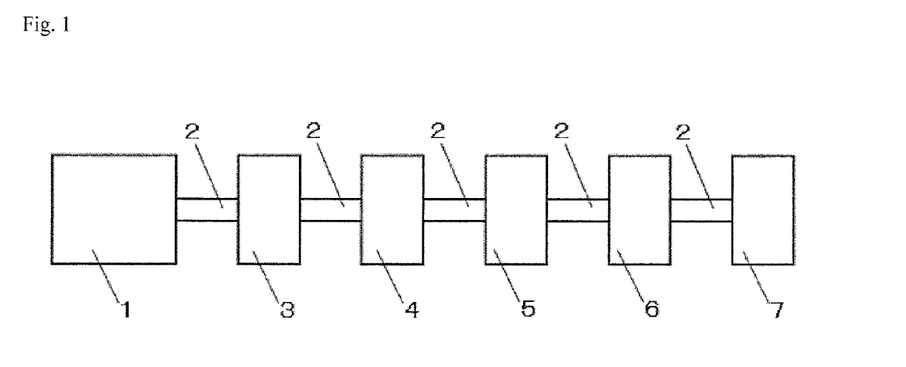

Burning Equipment:

Illustrative example of the burning equipment includes a boiler and a burning furnace. FIG. 1 shows a schematic diagram of an embodiment of the exhaust gas treatment of a boiler. In FIG. 1, the exhaust gas that is generated in a burning chamber of the boiler 1 goes through, via the smoke path 2, the denitration equipment 3 (SCR), the air-heating unit 4 (APH), the electric dust collector 5 (EP), and the desulfurization equipment 6, and then it is emitted from the chimney 7.

Meanwhile, though not shown in the figure, an equipment to charge $NH_3$ for denitration and neutralization is installed in the upstream of the denitration equipment 3 and the electric dust collector 5. Though not shown in the figure, the air that is heated by the high temperature exhaust gas in the air-heating unit 4 is sent to the burning chamber of the boiler 1.

Exhaust Gas Containing Ammonium Hydrogen Sulfate:

Ammonium hydrogen sulfate in the exhaust gas is generated in the burning equipment such as a boiler by the reaction between an $SO_2$ gas and $NH_3$ which is used for denitration and neutralization. The ammonium hydrogen sulfate thereby formed causes fouling by adhesion in ECO that is installed at the boiler outlet port, in the heat-exchanging member such as an element of APH, and in SCR, EP, and the like, thereby causing problems such as corrosion and clogging of the smoke path.

Step of Forming the Reaction Product:

In the step of forming the reaction product, by adding a tertiary amine and/or a quaternary ammonium compound to the exhaust gas which contains ammonium hydrogen sulfate, the reaction product between the ammonium hydrogen sulfate and the tertiary amine and/or the quaternary ammonium compound is produced (hereinafter, this reaction product is sometimes referred to as "reaction product").

The tertiary amine may be exemplified by those shown by the following general formula (I).

[Chem. 1]

(I)

In the general formula (I), $R^1$ to $R^3$ represent a linear, a branched, or a cyclic alkyl group having 1 to 6 carbon atoms, or a linear, a branched, or a cyclic alkenyl group having 1 to 6 carbon atoms, wherein these groups may be the same or different with each other.

$R^1$ to $R^3$ in the general formula (I) each is preferably those having 1 to 3 carbon atoms. In addition, $R^1$ to $R^3$ in the general formula (I) each is preferably an alkyl group, especially a linear alkyl group.

Specific example of the tertiary amine like this includes trimethylamine and triethylamine.

The quaternary ammonium compound may be exemplified by those shown by the following general formula (II).

[Chem. 2]

(II)

In the general formula (II), $R^4$ to $R^6$ represent a linear, a branched, or a cyclic alkyl group having 1 to 6 carbon atoms which may be optionally substituted by a hydroxyl group, or a linear, a branched, or a cyclic alkenyl group having 1 to 6 carbon atoms which may be optionally substituted by a hydroxyl group, wherein these groups may be the same or different with each other. In the general formula (II), $R^7$ represents a linear, a branched, or a cyclic alkylene group having 1 to 6 carbon atoms.

$R^4$ to $R^6$ in the general formula (II) each is preferably those having 1 to 3 carbon atoms. In addition, $R^4$ to $R^6$ in the general formula (II) each is preferably an unsubstituted alkyl group, especially a linear alkyl group.

$R^7$ in the general formula (II) is preferably the one having 1 to 4 carbon atoms. In addition, $R^7$ in the general formula (II) is preferably a linear one.

Specific example of the quaternary ammonium compound like this includes hydroxymethyl trimethyl ammonium hydroxide, hydroxymethyl triethyl ammonium hydroxide, hydroxyethyl trimethyl ammonium hydroxide, (2-hydroxyethyl) triethyl ammonium hydroxide, and (3-hydroxypropyl) trimethyl ammonium hydroxide.

The foregoing tertiary amines and/or quaternary ammonium compounds each may be used solely or as a mixture of two or more of them.

The reaction product is a sulfate salt of the tertiary amine and/or the quaternary ammonium compound (hereinafter, sometimes referred to as "sulfate salt"). For example, in the case that hydroxy diethyl trimethyl ammonium hydroxide (hereinafter, sometimes referred to as "choline"), the quaternary ammonium compound, is reacted with ammonium hydrogen sulfate, the choline sulfate is produced.

In the present invention, by forming the reaction product (sulfate salt) as mentioned above, and further by keeping this reaction product in the solid state by means of the later-mentioned control, adhesiveness of the matter derived from the ammonium hydrogen sulfate to the exhaust gas flow path including the smoke path, SCR, APH, EP, and the desulfurization equipment can be degraded, so that the problems such as corrosion and clogging of the smoke path may be avoided. The reaction product (sulfate salt) is hardly molten so that the adhesiveness thereof in the exhaust gas flow path is low; and thus, it moves together with the soot and so forth to the downstream in the exhaust gas flow path, whereby it can be collected and recovered by EP and the like.

Formation of the reaction product may be confirmed by measuring the pressure difference before and after the addition of the tertiary amine and/or the quaternary ammonium compound, or by analyzing the component taken from the fly ash in the downstream of the addition site of the tertiary amine and/or the quaternary ammonium compound.

Addition of the tertiary amine and/or the quaternary ammonium compound to the exhaust gas is done such that the molar ratio of [tertiary amine and/or quaternary ammonium compound]/[ammonium hydrogen sulfate] may be preferably 0.6 or more, or more preferably 1 or more. The upper limit of the molar ratio is not particularly restricted; however, the upper limit is preferably 2 or less.

Further, addition of the tertiary amine and/or the quaternary ammonium compound to the exhaust gas is done preferably in the form of an aqueous solution thereof. Concentration of the tertiary amine and/or the quaternary ammonium compound in the aqueous solution is, in view of handling workability during the addition operation and facilitating the humidity control in the smoke path, preferably in the range of 0.1 to 50% by mass, more preferably in the range of 0.2 to 30% by mass, still more preferably in the range of 0.3 to 10% by mass, or further still more preferably in the range of 0.3 to 1.0% by mass.

Addition of the tertiary amine and/or the quaternary ammonium compound is done preferably in the upstream of the site where the adhesion of ammonium hydrogen sulfate is intended to be prevented, more preferably in the smoke path in the upstream of the site where the adhesion is intended to be prevented. In addition, in order to prevent the adhesion of ammonium hydrogen sulfate in the entire exhaust gas flow path, and to secure uniformity of the addition thereof, the addition is done more preferably in plural sites with a small amount for each site rather than with a large amount in a single site.

Further, in considering fluctuation of the $SO_3$ concentration due to fluctuations of the charge amount and quality of the fuel, the tertiary amine and/or the quaternary ammonium compound may be effective if the addition thereof is made intermittently. In the intermittent addition, the addition time is in the range of several minutes to several hours for each addition, specifically in the range of about 30 minutes to about 3 hours and with the interval of about 30 minutes to about 3 hours.

As to the tertiary amine and/or the quaternary ammonium compound, the addition may be made in the form of the aqueous solution thereof, for example, in the way that the liquid concentrate or the dilute solution thereof may be added thorough a metal tube such as SUS that is inserted into the smoke path, or by spraying it through a spray nozzle that is inserted directly into the addition site of the smoke path and so forth. In the addition by spraying, it is preferable to use a high pressure spray nozzle producing droplets with the size of 2 to 3,000 μm, because by so doing the addition may be made uniformly.

Configuration of the spray nozzle may be adjusted in accordance with the addition site. In order that the spray nozzle may be avoided from the damage by heat and thermal corrosion, the nozzle may be covered outside thereof with a pipe (protection tube) having a larger diameter than the nozzle outer diameter, whereby an air with a normal temperature is constantly supplied into inside this tube by means of a compressor, a blower, or the like.

The spray nozzle is preferably the one which can spray the solution with the pressure of 0.1 to 5.0 MPa.

Alternatively, in considering fluctuation of the $SO_3$ concentration due to fluctuations in the charge amount and quality of the fuel, the spray nozzle may have configuration with which spraying can be done intermittently by an electromagnetic valve, an electricity-driven valve, or the like.

In the present invention, within the degree not to damage the effects of the present invention, a chemical other than the tertiary amine and/or the quaternary ammonium compound as well as $NH_3$ for denitration and neutralization may be added.

Step of Controlling the Temperature and Relative Humidity of the Exhaust Gas:

In the present invention, together with the step of forming the reaction product, in at least a part of the exhaust gas flow path of the burning equipment, the step of controlling the temperature and relative humidity of the exhaust gas is executed in such a way that the reaction product may be kept in the solid state.

The reaction product showing low adhesiveness as the solid state in the exhaust gas flow path as compared with ammonium hydrogen sulfate. Therefore, by keeping the reaction product in the solid state, the reaction product moves together with the soot and so forth to the downstream in the exhaust gas flow path, whereby it can be collected and recovered by EP and the like.

In the case that the reaction product is liquefied, there is a possibility that it may become an adhesion matter if the appropriate amount of water is not present; and in the case that the reaction product is gasified, there is a possibility that the vaporized compound may cause harmful effects in operation of the boiler as well as to an environment. In the present invention, it can be kept in the solid state; and thus, these problems may be prevented from occurring.

In order to keep the reaction product in the solid state, an artifice to control the temperature and the relative humidity of the exhaust gas flow path is considered.

Figure 2:
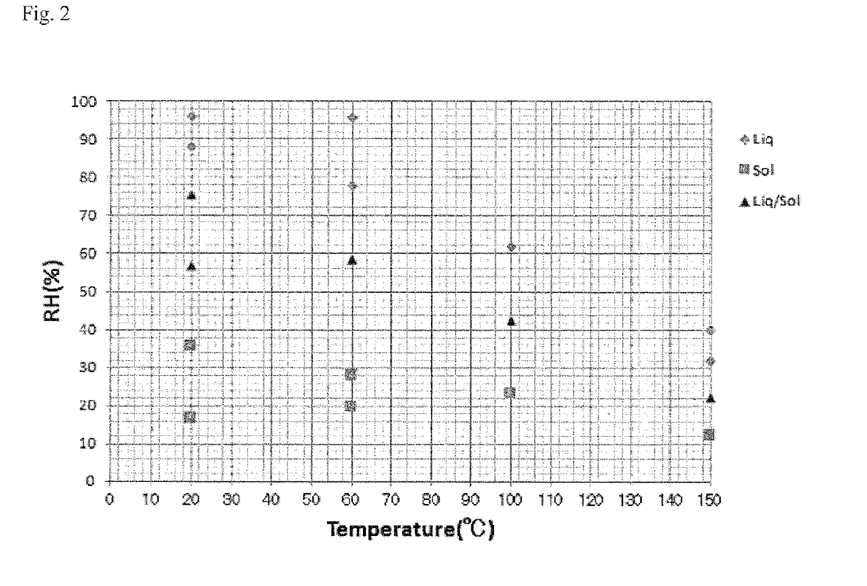

FIG. 2 is the scatter plot showing the states of the phase in the choline sulfate salt (the solid state (Sol), the mixed state of the solid and liquid states (Liq/Sol), or the liquid state (Liq)), one example of the reaction product, wherein the temperature is plotted in the x-axis and the relative humidity is plotted in the y-axis. From FIG. 2, it can be seen that as the temperature becomes higher, the critical value of the relative humidity at which the choline sulfate can be kept in the solid state becomes lower.

From the scatter plot shown in FIG. 2, it can be seen that the four relative humidity points, i.e., the highest relative humidity at which the choline sulfate salt can be kept in the solid state at the temperature of 20° C. (35.4%), the highest relative humidity at which the choline sulfate salt can be kept in the solid state at the temperature of 60° C. (28.0%), the highest relative humidity at which the choline sulfate salt can be kept in the solid state at the temperature of 100° C. (23.2%), and the highest relative humidity at which the choline sulfate salt can be kept in the solid state at the temperature of 150° C. (12.1%), are almost on the same linear line. In addition, it can be seen that the choline sulfate salt can be kept in the solid state below this linear line.

Accordingly, it can be seen that the reaction product can be kept in the solid state if the temperature and the relative humidity are controlled such that the relationship of $y \leq ax+b$ may be satisfied, wherein this equation is obtained as follows; the near-critical value of the relative humidity at which the reaction product can be kept in the solid state is measured at plural temperatures, whereby the temperatures are plotted in the x-axis and the near-critical value of the relative humidity at each of the said temperatures are plotted in the y-axis, and then, $y=ax+b$, the equation showing a relationship between the temperature and the near-critical value of the relative humidity, is calculated by the least square method. Meanwhile, "near" that is used "in the near-critical value of the relative humidity at which the reaction product can be kept in the solid state at each of the temperatures" means that this value is not necessary the critical value of the relative humidity at which the solid state can be kept at each temperature, but rather that the value may be near the critical value (if the relative humidity at the critical value is assumed to be 100, this value may be in the range of 85 or more to less than 100). This is because even if the above equation is calculated from those points which are lower than the relative humidity at the critical value, the reaction product can equally be kept in the solid state as far as the relationship of y≤ax+b is satisfied. The temperature measured the near-critical value of the relative humidity at which the reaction product can be kept in the solid state is not particularly restricted; therefore, for example, four measurement points of 20° C., 60° C., 100° C., and 150° C. may be mentioned.

If this equation is calculated by the least square method by using the values of the above-mentioned four points in FIG. 2 [(20° C., 35.4%), (60° C., 28.0%), (100° C., 23.2%), and (150° C., 12.1%)], it can be expressed by Y=−0.1746X+ 39.082. That is, from FIG. 2, it can be seen that if the temperature and the relative humidity are controlled in such a way that the following equation (1) may be satisfied, then the choline sulfate salt can be kept in the solid state.

$$Y \leq -0.1746X + 39.082 \qquad (1)$$

(In the equation, Y represents the relative humidity (%), and X represents the temperature (° C.).)

Meanwhile, the linear equation in FIG. 2 is shown by Y=−0.1746X+39.082.

By controlling the temperature and the relative humidity in the way as mentioned above, the reaction product can be kept in the solid state. Meanwhile, in view of ease of control and prevention of decomposition or of vaporization of the reaction product, the temperature is controlled preferably lower than 300° C., more preferably in the range of 10 to 200° C., or still more preferably in the range of 20 to 150° C. The relative humidity is controlled preferably in the range less than 40%.

The temperature of the exhaust gas flow path can be controlled by adjusting the temperature of the exhaust gas. The temperature of the exhaust gas can be controlled by, such as for example, the flow amount of the cooling medium in the heat-exchanger unit, the amount of the fuel to be used, and the oxygen concentration to be supplied.

The relative humidity of the exhaust gas flow path can be controlled by amount of water in the aqueous solution which contains the tertiary amine and/or the quaternary ammonium compound or by amount of water that is added separately. The amount of water to control the relative humidity cannot be unequivocally determined because it is different depending on the condition of the equipment; however, in considering the temperature and the amount of the exhaust gas as main factors, it may be determined somewhere in the range of 0.1 to 10,000 L/hour.

The control as mentioned above may be done in the site where prevention of the fouling is intended in the exhaust gas flow path. That is, the control as mentioned above may not be necessarily done in the entire of the exhaust gas flow path, but may be done in at least a part of it. The control as mentioned above is effective if it is done in the site where the reaction product is formed, either near the site at which addition of the tertiary amine and/or the quaternary ammonium compound is done or in the downstream thereof.

2. The Method for Removing Ammonium Hydrogen Sulfate Contained in the Exhaust Gas of the Burning Equipment The method for removing ammonium hydrogen sulfate which is contained in an exhaust gas of a burning equipment in the present invention comprises: a step of adding a tertiary amine and/or a quaternary ammonium compound to an exhaust gas which contains ammonium hydrogen sulfate which is generated in a burning equipment thereby forming a reaction product between the ammonium hydrogen sulfate and the tertiary amine and/or the quaternary ammonium compound, a step of controlling a temperature and a relative humidity in at least a part of an exhaust gas flow path of the burning equipment in such a way that the reaction product may be kept in a solid state, and a step of capturing the reaction product by a dust collector thereby removing the reaction product thus captured. Hereunder, explanation will be made as to embodiments of the method for removing ammonium hydrogen sulfate which is contained in an exhaust gas of a burning equipment in the present invention.

The step of forming the reaction product as well as the step of controlling the temperature and the relative humidity of the exhaust gas is the same as the afore-mentioned embodiments of the method for preventing fouling of the exhaust gas flow path of the burning equipment in the present invention.

Step of Removing the Reaction Product:

In the present invention, the reaction product is kept in the solid state, and in addition, the adhesiveness thereof is so low that the reaction product is transported in the solid particle state to the later stages of the burning equipment. Therefore, by installing a dust collector in the later stage of the burning equipment, the reaction product can be captured; and thus, by removing the captured reaction product, ammonium hydrogen sulfate can be removed from the burning equipment.

As to the dust collector, the filtration dust collector (bag filter), the electric dust collector (EP), and the like may be exemplified; however, the electric dust collector is superior in view of the ease in removal of the captured reaction product.

The electric dust collector may be classified roughly into a dry method and a wet method. In the dry method, the reaction product is removed from the collecting electrode, for example, by hitting the collecting electrode by a hammer or the like to cause a shock, and then, the reaction product collected in the hopper is transported to the ash treatment unit that is connected to the hopper, from which the reaction product can be eventually removed. In the wet method, the collecting electrode is washed, for example, by a cleaning solution to remove the reaction product from the collecting electrode; and then, the cleaning solution and the reaction product captured in the hopper are drained through the draining pipe that is connected to the hopper, so that the reaction product can be eventually removed.

EXAMPLES

Next, the present invention will be explained in more detail by Examples, but the present invention will not be restricted at all by these Examples.

Experimental Example 1

Confirmation Test of the Solid State of the Reaction Product (1)

1-1. Preparation of the Reaction Product
(1) Choline was added to the aqueous solution of ammonium hydrogen sulfate (concentration of 10% by mass) such that the molar ratio of choline to ammonium hydrogen sulfate ([choline]/[ammonium hydrogen sulfate]) might become 0.7.

(2) The aqueous solution prepared in (1) was distilled under reduced pressure by using a rotary evaporator.
(3) After the solvent was evaporated to some extent, the concentrated solution was washed by isopropyl alcohol for several times; and then, after the supernatant solution was removed, the remainder was dried in a vacuum desiccator under reduced pressure to obtain a sample.

1-2. Confirmation of the Solid State (1) An aqueous sulfuric acid for adjustment of the humidity was put in the desiccator bottom.
(2) The reaction product was taken in a weighing bottle whose weight was measured in advance, and then it was kept in the desiccator.
(3) The desiccator was kept in a constant temperature chamber heated at a prescribed temperature, and then the bottle was taken out at a regular interval to observe the appearance of the reaction product. The results of it are shown in FIG. 2.

From the results shown in FIG. 2, it can be confirmed that the choline sulfate salt neither melts nor becomes a liquid but rather keeps the solid state thereof under the condition to satisfy the equation $Y \leq -0.1764X + 39.082$, wherein X represents the temperature (° C.), and Y represents the relative humidity (%).

Experimental Example 2

Confirmation Test of the Solid State of the Reaction Product (2)

2-1. Preparation of the Reaction Product

In the way similar to Experimental Example 1, the reaction product (test sample) was prepared.

2-2. Confirmation of the Solid State (Measurement of TG-DTA)

Figure 3:
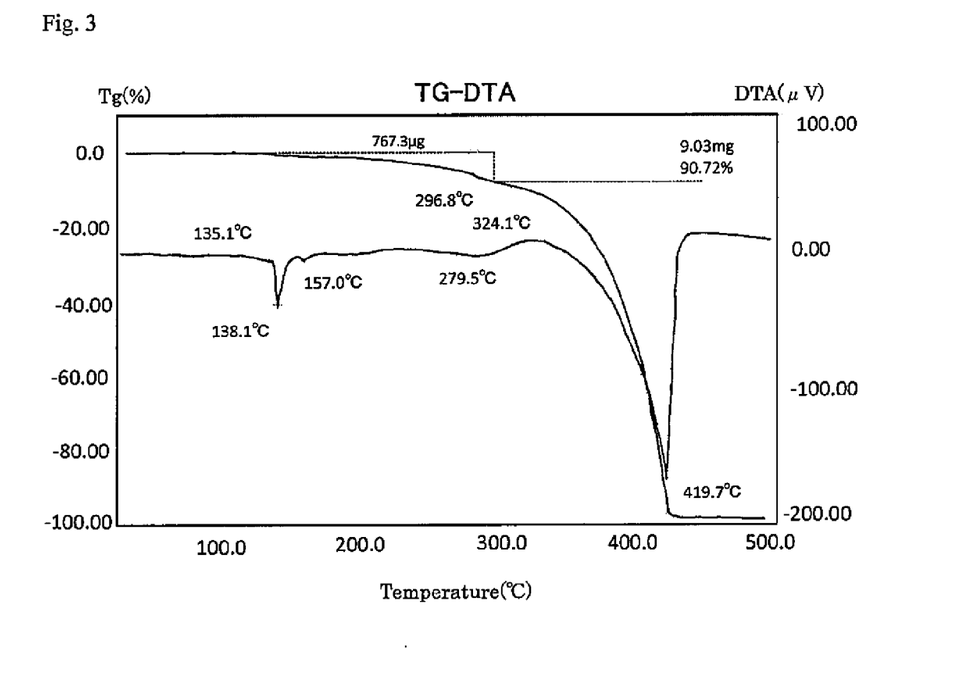
Figure 4:
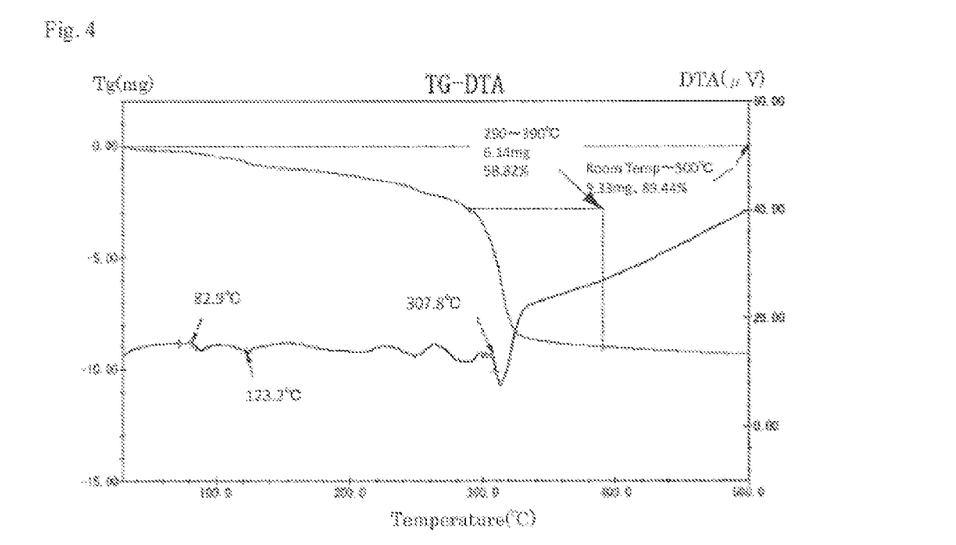

The TG-DTA measurements were done as to ammonium hydrogen sulfate and the test sample under the condition shown below. The results are shown in FIG. 3 and FIG. 4.
(Measurement Condition)
Atmosphere: under the nitrogen gas stream (flow rate of 200 mL/minute)
Temperature ascending rate: 5° C./minute
Reference sample; $\alpha$-$Al_2O_3$ From FIG. 3, it can be seen that ammonium hydrogen sulfate shows the melting peak in the range of 135 to 157° C.; and then, it starts gradual decomposition from 329° C. and almost completes the decomposition at about 420° C.

On the other hand, from FIG. 4, it can be seen that the reaction product (choline sulfate salt) does not have the melting peak; instead, it starts gradual decomposition immediately after the start of heating, and almost completes the decomposition at about 300° C.

From the results of Experimental Examples 1 and 2, it can be confirmed that the reaction product obtained by reacting ammonium hydrogen sulfate with the tertiary amine and/or the quaternary ammonium compound can be kept in the solid state under the conditions that the temperature is 300° C. or lower and the relative humidity is less than 40%.

Furthermore, because ammonium hydrogen sulfate has the melting peak in the temperature range of 135 to 157° C. while the reaction product does not have the melting peak, it can be confirmed that the reaction product does not cause adhesiveness due to melting so that adhesion thereof in the exhaust gas flow path can be suppressed.

Experimental Example 3

Figure 5:
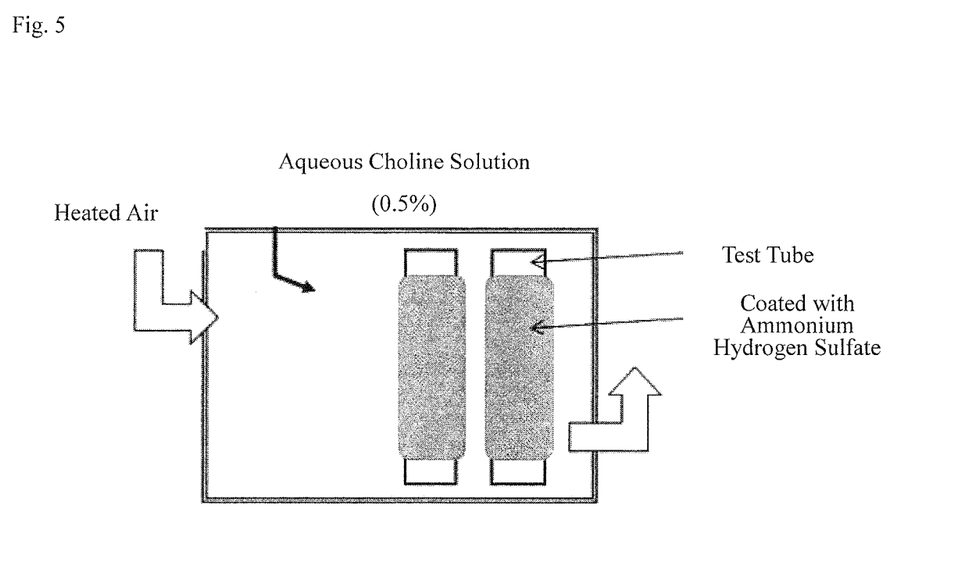

Confirmation Test of Removal Effect of Ammonium Hydrogen Sulfate 3-1. Test Apparatus As the test apparatus, the model plant as shown in FIG. 5, which comprises the suction port of a heated air in one end of the container, the vent in other end of the container, the heat-exchanging tubes inside the container, and a nozzle in the upstream side of the heat-exchanging tubes in the container, was used.

3-2. Test Procedure (1) Ammonium hydrogen sulfate which is collected from the actual plant is applied on the heat-exchanging tubes of the model plant.
(2) An air heated at 200° C. is flown into the model plant.
(3) The aqueous choline solution (concentration of 0.5% by mass) is added at the rate of 24 L/hour from the nozzle which is installed in the upstream of the model plant. Meanwhile, from the gas analysis, the relative humidity during the test was 2.7%.

3-3. Judgment of the Effect (1) State of Adhesion

The adhesive substance on surface of the heat-exchanging tube was visually confirmed. As a result, the adhesive substance was hardly confirmed. On the other hand, when the aqueous choline solution was not added, significant amount of ammonium hydrogen sulfate was adhered on surface of the heat-exchanging tube.

(2) Measurement of TG-DTA of the Adhesion Substance

The TG-DTA measurement of a very small amount of the adhesive substance on surface of the heat-exchanging tube was done under the same conditions as Experimental Example 2. The result is shown in FIG. 6.

Figure 6:
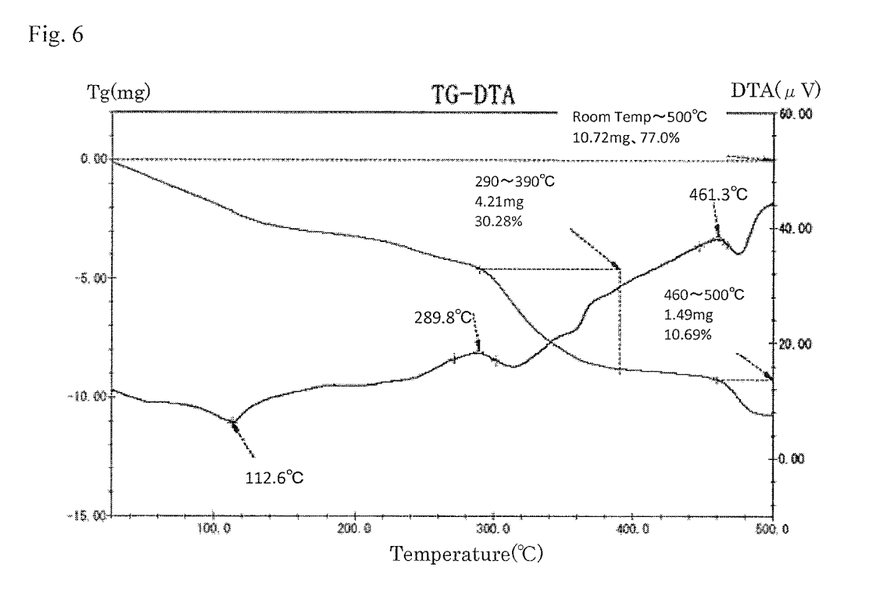

From the comparison between FIG. 3 and FIG. 6, it can be confirmed that ammonium hydrogen sulfate is reformed and that this reformed product does not have the melting peak at about 150° C., which is the melting peak of ammonium hydrogen sulfate.

REFERENCE NUMERALS

1. Boiler
2. Smoke path
3. Denitration equipment (SCR)
4. Air heating unit (APH)
5. Electric dust collector (EP)
6. Desulfurization equipment
7. Chimney

The invention claimed is:
1. A method for preventing fouling of an exhaust gas flow path of a burning equipment, the method comprising:
a step of adding a tertiary amine and/or a quaternary ammonium compound to an exhaust gas which contains ammonium hydrogen sulfate which is generated in a burning equipment, thereby forming a reaction product between the ammonium hydrogen sulfate and the tertiary amine and/or the quaternary ammonium compound, and
a step of controlling a temperature and a relative humidity in at least apart of an exhaust gas flow path of the burning equipment in such a way that the reaction product may be kept in a solid state, wherein the tertiary amine is represented by formula (I)

(I)

where $R^1$ to $R^3$ represent a linear, a branched, or a cyclic alkyl group having 1 to 6 carbon atoms, or a linear, a branched, or a cyclic alkenyl group having 1 to 6 carbon atoms, and $R^1$ to $R^3$ may be the same or different with each other, and the quaternary ammonium compound is represented by formula (II)

(II)

where $R^4$ to $R^6$ represent a linear, a branched, or a cyclic alkyl group having 1 to 6 carbon atoms which may be optionally substituted by a hydroxyl group, or a linear, a branched, or a cyclic alkenyl group having 1 to 6 carbon atoms which may be optionally substituted by a hydroxyl group, and $R^4$ to $R^6$ may be the same or different with each other, and where $R^7$ represents a linear, a branched, or a cyclic alkylene group having 1 to 6 carbon atoms.

2. The method for preventing fouling of an exhaust gas flow path of a burning equipment according to claim 1, wherein a near-critical value of a relative humidity at which the reaction product can be kept in a solid state is measured at plural temperatures, whereby the temperatures are plotted in the x-axis and the near-critical value of the relative humidity are plotted in the y-axis, and then, y=ax+b, an equation showing a relationship between the temperature and the near-critical value of the relative humidity, is calculated by a least square method, and further the temperature and the relative humidity are controlled such that the relationship of y≤ax+b may be satisfied so that the reaction product may be kept in the solid state.

3. The method for preventing fouling of an exhaust gas flow path of a burning equipment according to claim 1, wherein in the step of forming the reaction product, hydroxy diethyl trimethyl ammonium hydroxide is used as the tertiary amine and/or the quaternary ammonium compound and a sulfate salt of the hydroxy diethyl trimethyl ammonium hydroxide is formed as the reaction product, and in the step of controlling a temperature and as relative humidity, the temperature and the relative humidity are controlled in such a way that a relationship of the following equation (1) may be satisfied so that the sulfate salt of the hydroxy diethyl trimethyl ammonium hydroxide may be kept in the solid state $$Y \leq -0.1746X + 39.082 \quad (1)$$

(In the equation, Y represents the relative humidity (%), and X represents the temperature (° C.)).

4. The method for preventing fouling of an exhaust gas flow path of a burning equipment according to claim 1, wherein the tertiary amine is trimethylamine or triethylamine, and the quaternary ammonium compound is one selected from the group consisting of hydroxymethyl trimethyl ammonium hydroxide, hydroxymethyl triethyl ammonium hydroxide, hydroxyethyl trimethyl ammonium hydroxide, (2-hydroxyethyl) triethyl ammonium hydroxide, and (3-hydroxypropyl) trimethyl ammonium hydroxide.

5. A method for removing ammonium hydrogen sulfate which is contained in an exhaust gas of a burning equipment, the method comprising:

a step of adding a tertiary amine and/or a quaternary ammonium compound to an exhaust gas winch contains ammonium hydrogen sulfate which is generated in a burning equipment, thereby forming a reaction product between the ammonium hydrogen sulfate and the tertiary amine and/or the quaternary ammonium compound, a step of controlling a temperature and a relative humidity in at least a part of an exhaust gas flow path of the burning equipment in such a way that the reaction product may be kept in a solid state, and a step of capturing the reaction product by a dust collector thereby removing the reaction product thus captured, wherein the tertiary amine is represented by formula (I)

(I)

where $R^1$ to $R^3$ represent a linear, a branched, or a cyclic alkyl group having 1 to 6 carbon atoms, or a linear, a branched, or a cyclic alkenyl group having 1 to 6 carbon atoms, and $R^1$ to $R^3$ may be the same or different with each other, and the quaternary ammonium compound is represented by formula (II)

(II)

where $R^4$ to $R^6$ represent a linear, a branched, or a cyclic alkyl group having 1 to 6 carbon atoms which may be optionally substituted by a hydroxyl group, or a linear, a branched, or a cyclic alkenyl group having 1 to 6 carbon atoms which may be optionally substituted by a hydroxyl group, and $R^4$ to $R^6$ may be the same or different with each other, and where $R^7$ represents a linear, a branched, or a cyclic alkylene group having 1 to 6 carbon atoms.

6. The method for removing ammonium hydrogen sulfate which is contained in an exhaust gas of a burning equipment according to claim 5, wherein a near-critical value or a relative humidity at which the reaction product can be kept in a solid state is measured at plural temperatures whereby the temperatures are plotted in the x-axis and the near-critical value of the relative humidity are plotted in the y-axis, and then, y=ax+b, an equation showing a relationship between the temperature and the near-critical value of the relative humidity, is calculated by a least square method, and further the temperature and the relative humidity are controlled such that the relationship of y≤ax+b may be satisfied so that the reaction product may be kept in the solid state.

7. The method for removing ammonium hydrogen sulfate which is contained in an exhaust as of a burning equipment according to claim 5, wherein in the step of forming the reaction product, hydroxy diethyl trimethyl ammonium hydroxide is used as the tertiary amine and/or the quaternary ammonium compound and a sulfate salt of the hydroxy diethyl trimethyl ammonium hydroxide is formed as the reaction product, and in the step of controlling a temperature and a relative humidity, the temperature and the relative humidity are controlled in such a way that a relationship of the following equation (1) may be satisfied so that the sulfate salt of hydroxy diethyl trimethyl ammonium hydroxide may be kept in the solid state $$Y \leq -0.1746X + 39.082 \tag{1}$$

(In the equation, Y represents the relative humidity (%) and X represents the temperature (° C.)).

8. The method for removing ammonium hydrogen sulfate which is contained in an exhaust gas of a burning equipment according to claim 5, wherein the tertiary amine is trimethylamine or triethylamine, and the quaternary ammonium compound is one selected from the group consisting of hydroxymethyl trimethyl ammonium hydroxide, hydroxymethyl triethyl ammonium hydroxide, hydroxyethyl trimethyl ammonium hydroxide, (2-hydroxyethyl) triethyl ammonium hydroxide, and (3-hydroxypropyl) trimethyl ammonium hydroxide.

\* \* \* \* \*